(No Model.) 3 Sheets—Sheet 2.
L. PFINGST & S. A. BEMIS.
BRAKE FOR ELECTRIC CAR TRUCKS.
No. 414,575. Patented Nov. 5, 1889.
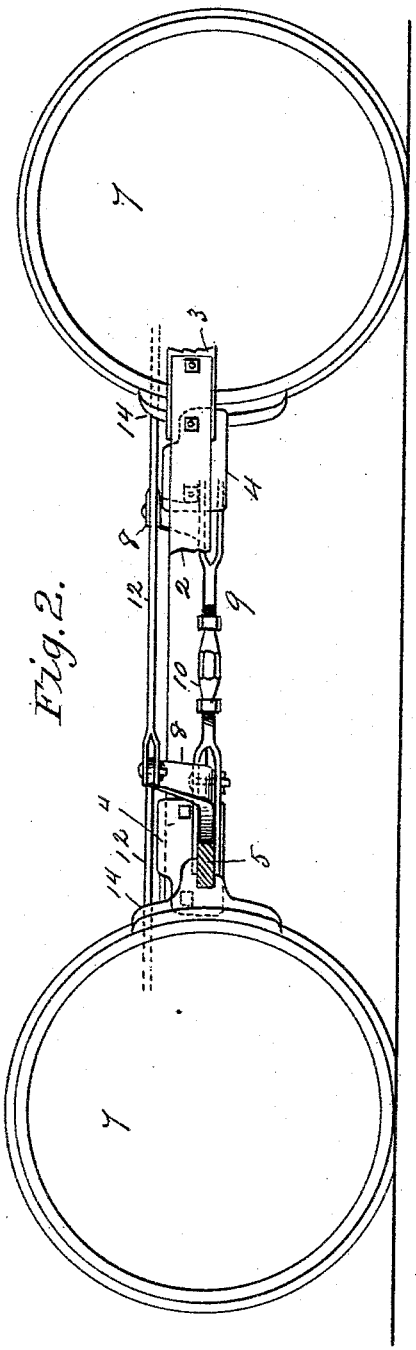
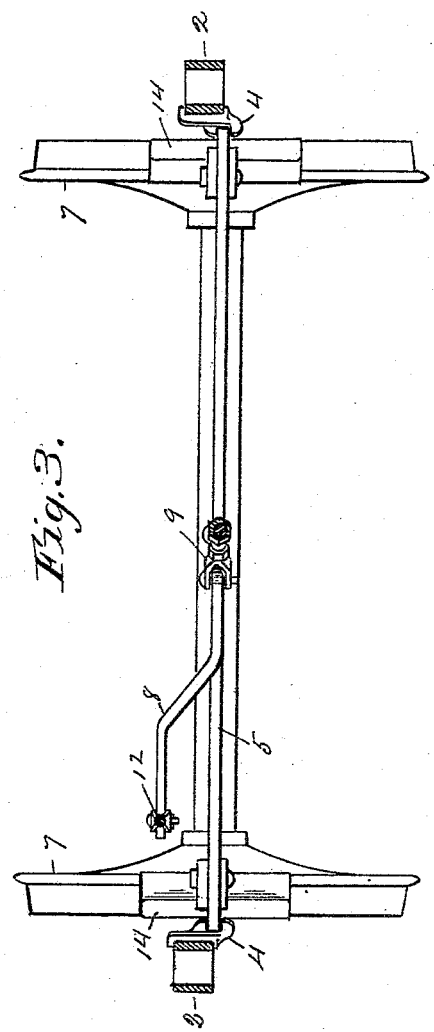
Witnesses:
Inventors:

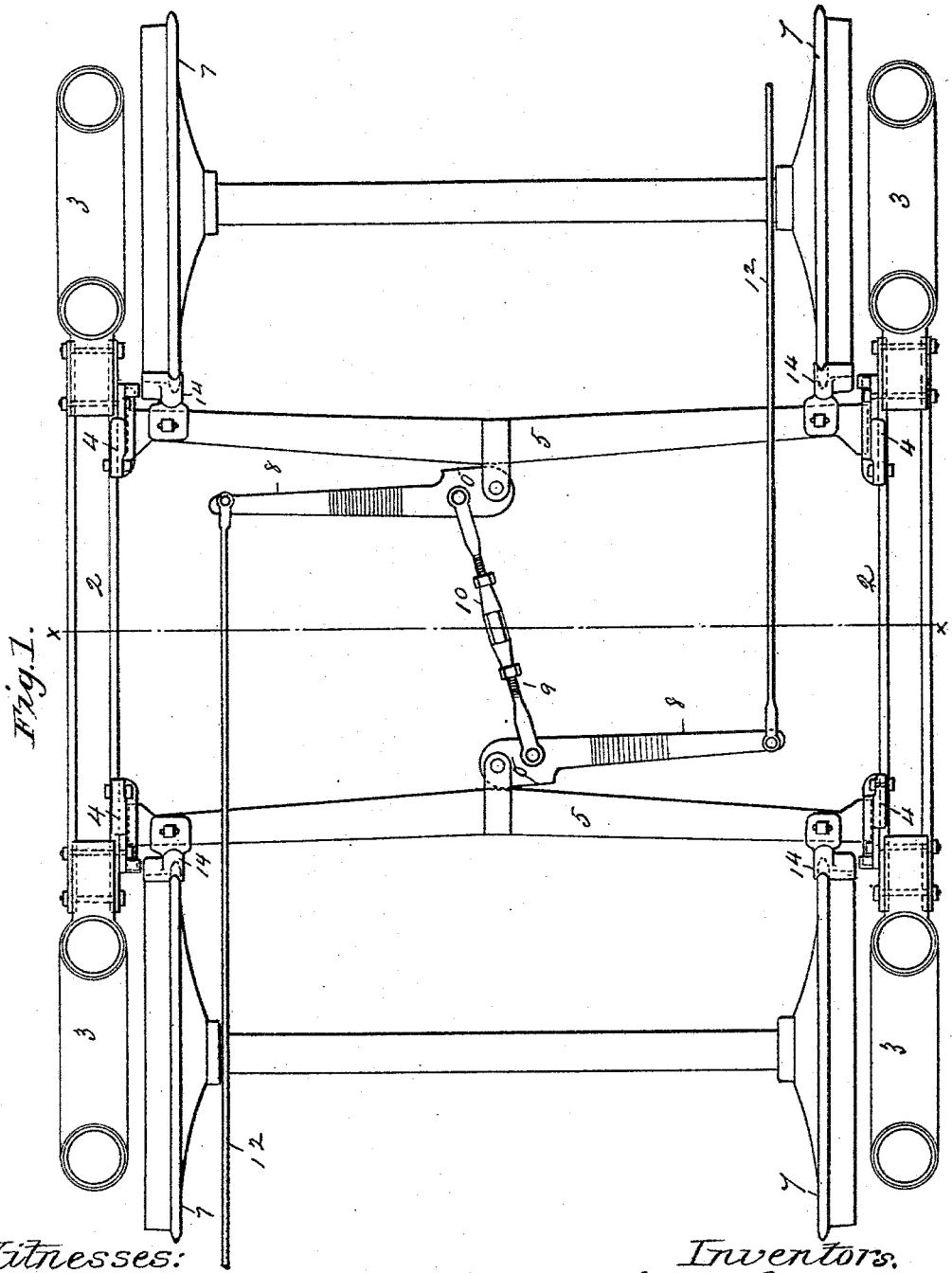

(No Model.) 3 Sheets—Sheet 3.
L. PFINGST & S. A. BEMIS.
BRAKE FOR ELECTRIC CAR TRUCKS.
No. 414,575. Patented Nov. 5, 1889.
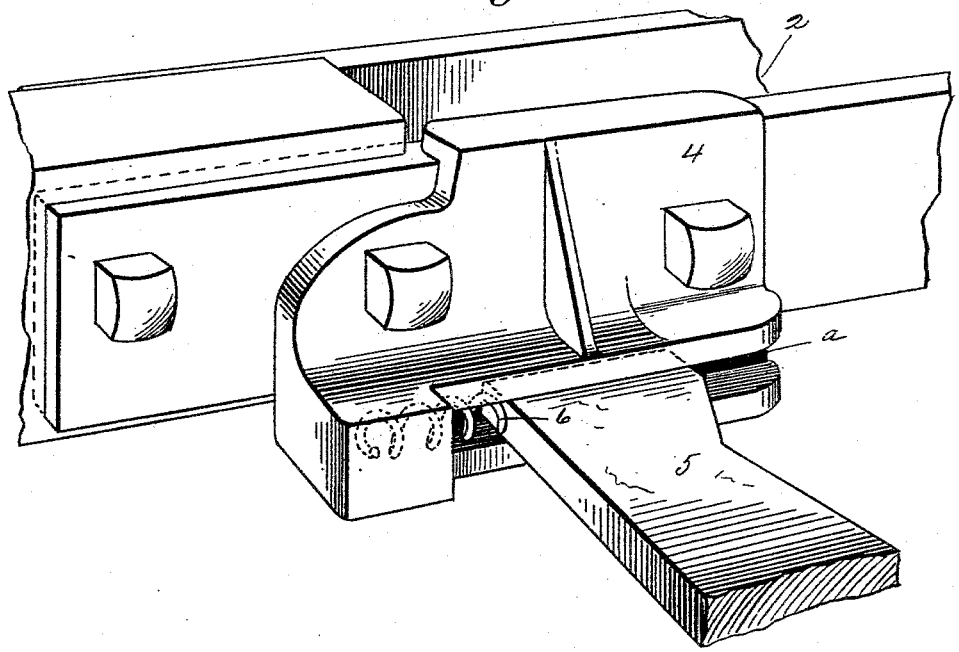
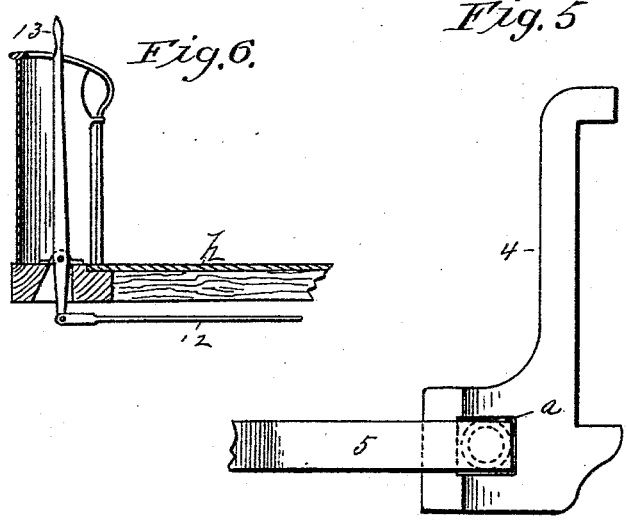
Witnesses:
J. D. Garfield
C. W. Chamberlain
Inventors.
Louis Pfingst
Sumner A. Bemis
by Chapin &
Attorneys.

UNITED STATES PATENT OFFICE.

LOUIS PFINGST, OF BOSTON, AND SUMNER A. BEMIS, OF SPRINGFIELD, MASSACHUSETTS.

BRAKE FOR ELECTRIC-CAR TRUCKS.

SPECIFICATION forming part of Letters Patent No. 414,575, dated November 5, 1889.

Application filed September 2, 1889. Serial No. 322,788. (No model.)

*To all whom it may concern:*

Be it known that we, LOUIS PFINGST and SUMNER A. BEMIS, citizens of the United States, residing, respectively, at Boston, in the county of Suffolk, and at Springfield, county of Hampden, and State of Massachusetts, have invented new and useful Improvements in Brake Devices for Electric-Car Trucks, of which the following is a specification.

This invention relates to electric-railway-car trucks, the object being to provide improved brake devices for the trucks of the above-mentioned description of cars, whereby the space between the axles of said trucks and the ends of the car which may be required for an electric motor is not encumbered inconveniently with any of the brake-operating mechanism; and the invention consists in the construction and means of hanging and for operating said brake devices, all as is hereinafter fully described, and pointed out in the claims.

In the drawings forming part of this specification, Figure 1 is a plan view of such parts of a car-truck as are essential to the illustration of this invention, having brake devices applied thereto embodying our invention. Fig. 2 is a side elevation, partly in section, of portions of said truck, one of the side bars thereof being shown partly broken away. Fig. 3 is a transverse section about on line *x x*, Fig. 1. Fig. 4 is a perspective view of a portion of the side bar and axle-box yoke of the truck, and of one of the brake-beam hangers attached thereto, this figure showing also a portion of one end of a brake-beam hanger in operative position in the groove of said hanger. Fig. 5 is an end elevation of said brake-beam hanger and of a portion of a brake-beam engaged therewith. Fig. 6 is a vertical section of a portion of the platform of a car, showing a vertical brake-lever pivotally connected thereto and a portion of a brake-rod connected to said lever.

In the drawings, 2 indicates the side bars of the car-truck, and 3 the axle-box yokes thereof, which extend over and have an engagement with the upper sides of the axle-boxes in the usual manner, said boxes not being shown in the drawings. The said side bars 2 are rigidly attached to the inner ends of said yokes 3, as shown in the drawings, and to the inner opposite sides of said bars are rigidly bolted four brake-beam hangers, (indicated by 4 in the drawings,) two for each brake-beam 5. The construction of said brake-beam hangers 4 is clearly illustrated in Figs. 4 and 5, and each hanger has formed therein a longitudinal groove *a*, in which the end of a brake-beam 5 engages, and has a sliding motion when the brakes are moved toward and from the wheels 7 of the car-truck. A coil or other spring 6 is placed at the rear end of said groove in the hanger, against which the end of the brake-beam in each hanger is forced when the brakes are applied to the wheels, the reaction of said spring, when the brakes are released, serving to positively move the brake-beam and the brake-shoes which are attached thereto away from the truck-wheels. The brake-shoes 14, which are made preferably of iron in the usual way, are rigidly connected near each end of each of the brake-beams 5. On each of the brake-beams 5 is pivoted by one end a lever 8, having on one edge near its pivoted end a straight portion *o*, which, when the free end of the lever swings toward the brake-beam, strikes the edge of the lever and stops the swinging motion of said lever before its said free end shall have swung to the edge of said beam. The said levers 8 are connected together near their pivoted ends by a connecting-rod 9, made in two parts and united by a tubular screw-coupling 10, the screws uniting said coupling, and the said parts of the connecting-rod being right and left, to the end that by turning said coupling the said connecting-rod has its length more or less adjusted between said levers for the purpose of producing the requisite brake-beam movement when either one of said levers is operated upon by a brake-lever at the end of a car to which one of said trucks is applied, as is hereinafter described. The ends of said lever 8, to which the brake-rods 12 are connected, are bent upward near their ends, as shown in Figs. 2 and 3, in order to support said brake-rods in positions above the axles of the truck, said brake-rods also being, by the arrangement and position of said levers 8, supported in lines near the sides of the truck, whereby the space between the axles of the latter and the outer ends of the truck is left entirely free from inconvenient obstruction by any of the brake devices, so that an electric motor may be attached to a car having said truck thereon at the end or ends of the latter without inconvenience.

Fig. 6 illustrates a portion *h* of one of the platforms of a car to which the within-described truck and brake devices are adapted to be applied, said platform portion having a brake-lever 13 pivotally connected thereto in a vertical position, which brake-lever is adapted to have the outer end of the brake-rod 12 connected thereto, as shown, and a brake-lever of this or similar description is attached to each platform of the car, preferably in such position on the platform thereof that the lower end of said lever when vibrated will draw in a straight line with the brake-rod 12 to impart a vibratory motion to both of said levers 8 simultaneously, thereby producing a movement of both of the brake-beams 5 at the same time toward the truck-wheels and forcing the brake-shoes thereagainst. The said movement of the brake-beams 5, when one of said levers 8 is operated upon by one of the brake-levers 13, takes place when the straight portion *o* of one of said levers shall have come in contact with the edge of the brake-beam, thereby arresting the swinging motion of that lever.

The above-described arrangement and operation of the brake devices, which are located centrally between the wheels of the car-truck, by a pivoted brake-lever, as described, located on the platform of a car, or one producing a similar movement of the brake-rod 12, provides improved means for operating the brakes of this class with greater promptness to apply and release the brakes than can be effected by the use of the ordinary winding or rotating shaft, for in the construction herein shown and described both of the brake-beams 5 and their connected brake-shoes are, by a simple movement of the free end of the brake-lever 13 in one direction, forced against the truck-wheels, and by a like movement of the brake-lever in the opposite direction the brakes are released from the wheels. The said brake-beam hangers 4, which provide a support for each end of each brake-beam, serve to so support the brake-beams and resist the strain which is brought upon them through the engagement of the brake-shoes with the wheels as to obviate practically any danger of breakage or derangement from the effect of said strain.

While, as above set forth, the within-described arrangement of brake devices facilitates the attachment of motors to electric-car trucks, it is obvious that their use is in no way confined to this description of trucks, but they may be used with advantage on any other car-trucks as well. Furthermore, as will be clearly seen, the above-described means for hanging the brake-beams on the car-truck, which virtually has no vertical motion relative to the tread of the rail, provides for their rigid support in substantially an unvarying position vertically relative to the axes of the car-axles of the truck, thereby providing for a much more rigid and effective retention of said brake-beams in proper position when the brakes are "put on" than is possible when the beams are hung to a car-body, as heretofore practiced.

What we claim as our invention is—

1. Brake devices for car-trucks, consisting of two brake-beams located between the truck-axles and extending between the inner opposite sides of the side bars of the truck, combined with grooved hangers 4, rigidly fixed on said bars, in which the ends of said beams engage and slide, a lever 8, pivoted on each of said beams, a connecting-rod pivotally connecting said levers, and a brake-lever connected with each of said levers 8, substantially as set forth.

2. Brake devices for car-trucks, consisting of two brake-beams located between the truck-axles and extending between the inner opposite sides of the side bars of the truck, combined with grooved hangers 4, rigidly fixed on said bars, in which the ends of said beams engage and slide, a spring at the inner end of said groove in each of said hangers, a lever 8, pivoted on each of said beams, a connecting-rod pivotally connecting said levers, and a brake-lever connected with each of said levers 8, substantially as set forth.

LOUIS PFINGST.
SUMNER A. BEMIS.

Witnesses:
 H. A. CHAPIN,
 G. M. CHAMBERLAIN,
 O. M. SHAW,
 J. D. MATTHEWS.